June 4, 1963 H. M. GEYER 3,092,082
ACTUATOR ASSEMBLY
Filed Oct. 30, 1961 3 Sheets-Sheet 1

INVENTOR.
HOWARD M. GEYER
BY
HIS ATTORNEY

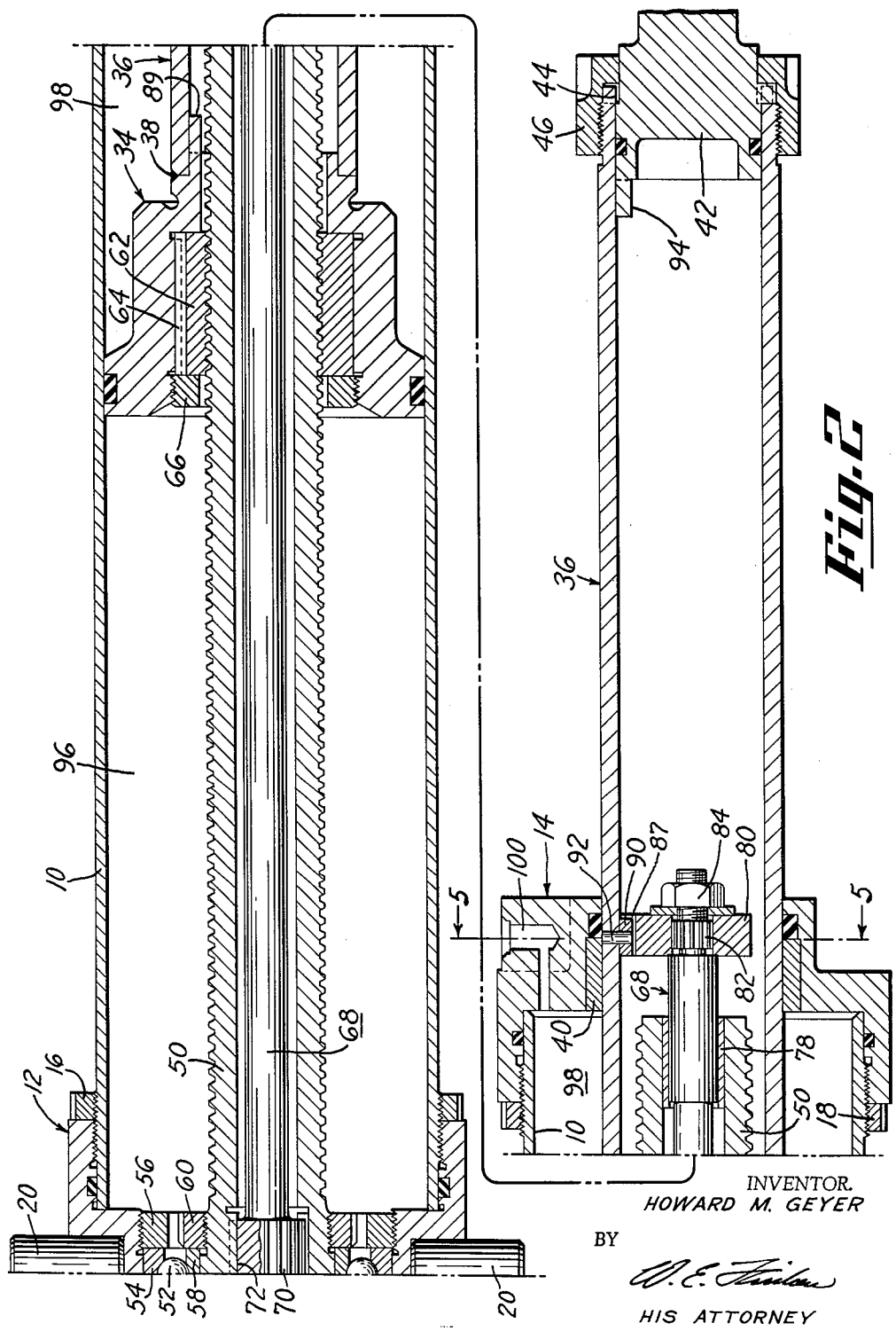

June 4, 1963   H. M. GEYER   3,092,082
ACTUATOR ASSEMBLY
Filed Oct. 30, 1961   3 Sheets-Sheet 3
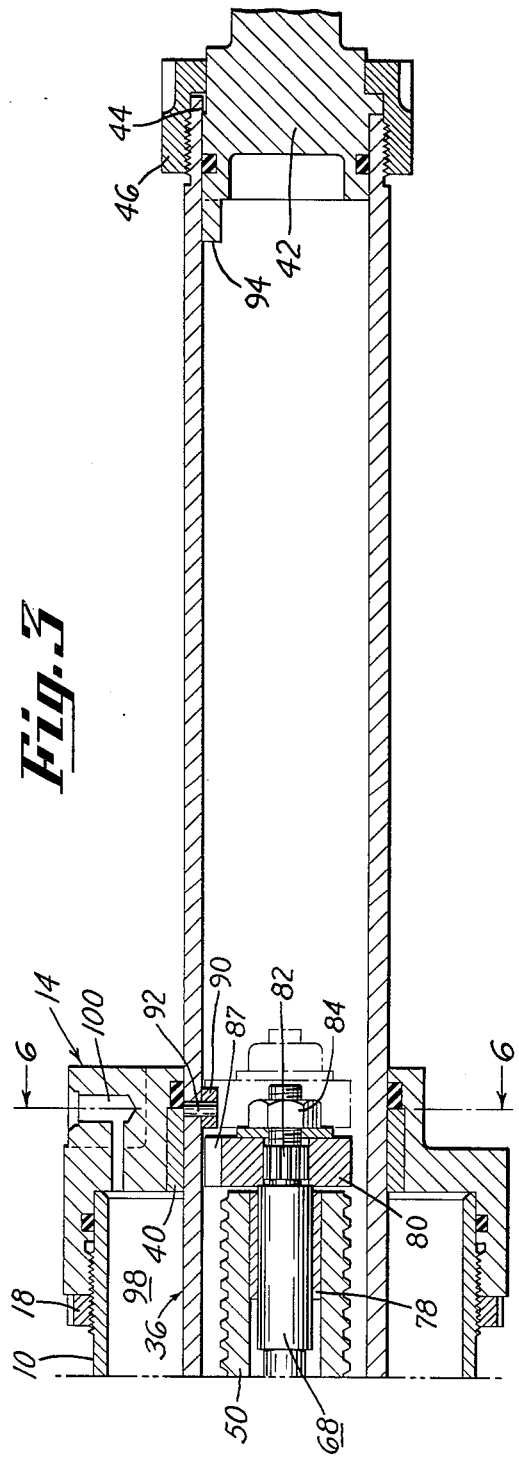
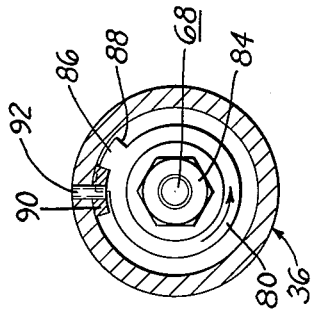
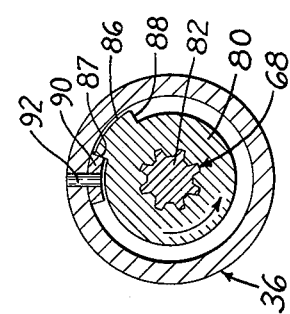
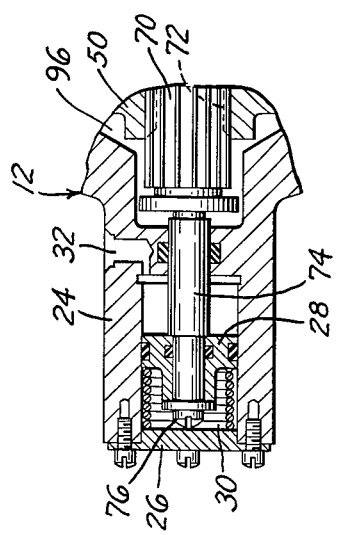
INVENTOR.
HOWARD M. GEYER
BY
W. E. Finlan
HIS ATTORNEY United States Patent Office 3,092,082
Patented June 4, 1963

3,092,082
ACTUATOR ASSEMBLY
Howard M. Geyer, Dayton, Ohio, assignor to General Motors Corporation, Detroit, Mich., a corporation of Delaware
Filed Oct. 30, 1961, Ser. No. 148,518
10 Claims. (Cl. 121—40)

This invention pertains to actuators, and particularly to a linear actuator having retractable stop means for determining the stroke thereof.

In amphibious vehicles actuators for extending and retracting the wheels are required including means for locking the actuators when the wheels are fully retracted. It is also desirable to provide for limited movement of the wheels when the vehicle is operated on land for shock absorbing purposes. This invention relates to an actuator assembly including means for locking the actuator in the fully retracted position and torsionally resilient stop means permitting movement of the actuator through a limited stroke between partially and fully extended positions for shock absorbing purposes.

Accordingly, among my objects are the provision of an actuator assembly including torsion bar means for locking the actuator in the fully retracted position; the further provision of a linear actuator assembly including releasable torsion bar operated lock and stop means; and the still further provision of an actuator of the piston and cylinder type including torsion bar operated stop means for limiting the stroke of the actuator between partially and fully extended positions.

The aforementioned and other objects are accomplished in the present invention by embodying a rotatable and axially movable torsion bar in the actuator assembly. Specifically, the actuator assembly comprises a cylinder having a reciprocable piston therein capable of fluid pressure differential movement in opposite directions. The piston carries a nut having threaded engagement with a hollow screw shaft journalled within the cylinder. Both the piston and the cylinder are restrained against rotation, and hence reciprocation of the piston is dependent upon and effects rotation of the screw shaft. The piston is attached to a hollow axially extending rod having an arcuate stop lug adjacent its outer end, adjacent its inner end and intermediate its ends.

A torsion bar is coaxially disposed within the hollow screw shaft and has a straight spline connection with the screw shaft so as to be capable of axial movement relative to the screw shaft although constrained for rotation therewith. The inner end of the torsion bar is operatively connected with a release piston which is spring biased in one direction and movable under the urge of fluid pressure in the opposite direction. The torsion bar has a stop member attached to its outer end with a pair of circumferentially spaced shoulders that coact with the arcuate stop lugs on the piston rod. When the torsion bar stop member is engaged by any of the piston rod carried lugs, rotation of the torsion bar and the screw shaft are precluded thereby preventing movement of the piston in a given direction.

The arcuate lug on the piston rod adjacent its outer end coacts with one shoulder of the torsion bar stop in the fully retracted position of the actuator piston, to prevent extension of the actuator piston and accordingly, functions as a lock to maintain the actuator fully retracted. The intermediate and inner arcuate lugs on the piston rod coact with the torsion bar stop to limit the stroke of the actuator piston between partially and fully extended positions wherein the actuator can be used as a hydraulic spring accumulator.

Further objects and advantages of the present invention will be apparent from the following description, reference being had to the accompanying drawings wherein a preferred embodiment of the invention is clearly shown and wherein like numerals depict like parts throughout the several views.

In the drawings:

FIGURE 2 is a fragmentary longitudinal sectional view of the actuator assembly shown in the partially extended position with the intermediate stroke stop engaged.

FIGURE 3 is a fragmentary sectional view of the actuator with the intermediate stroke stop released.

FIGURE 4 is a fragmentary sectional view of the stop release mechanism subjected to fluid under pressure.

FIGURE 5 is a sectional view taken along line 5—5 of FIGURE 2.

FIGURE 6 is a sectional view taken along line 6—6 of FIGURE 3.

Figure 1:
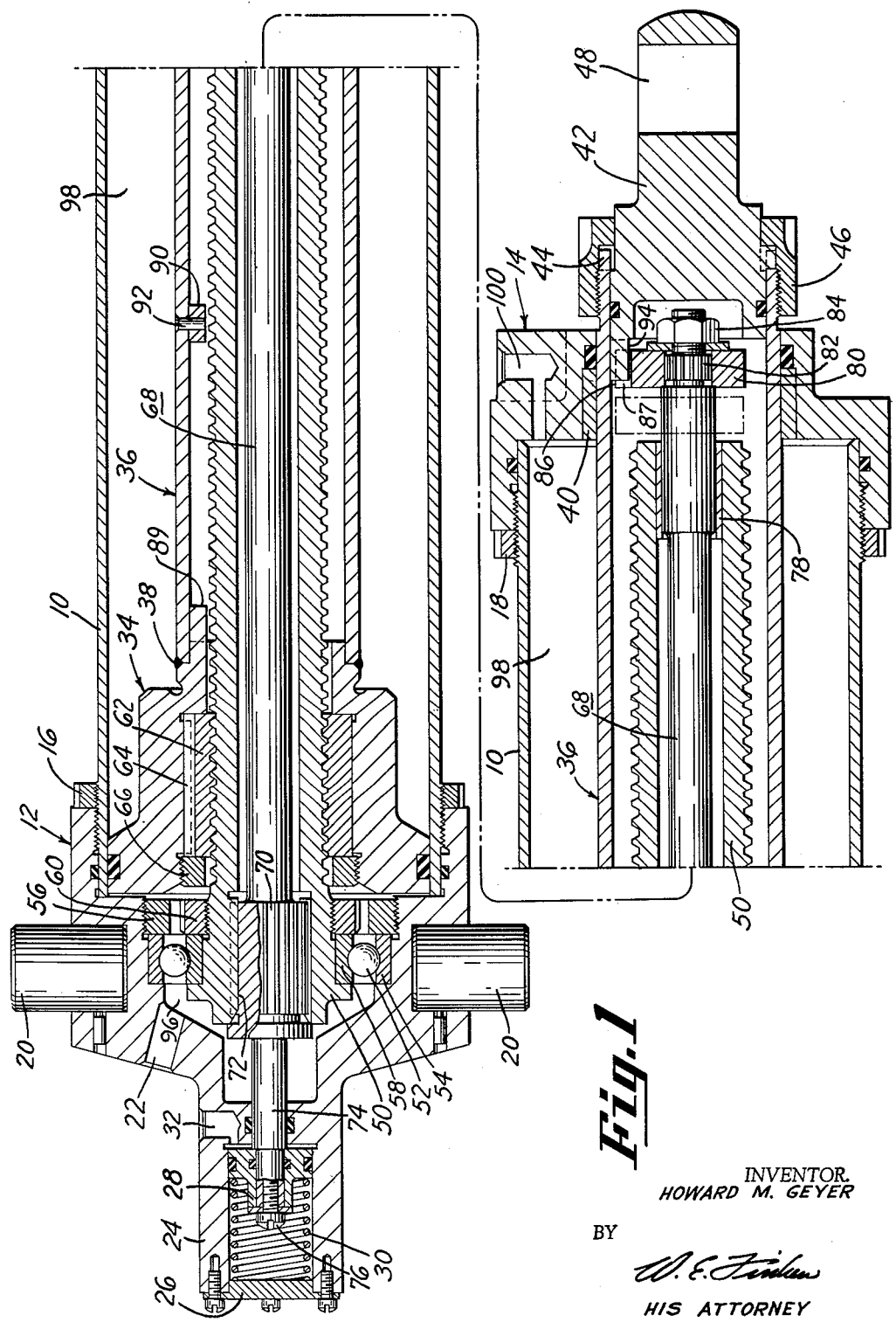
FIGURE 1 is a longitudinal sectional view of an actuator constructed according to the present invention shown in the fully retracted position with the stroke end lock engaged.

With particular reference to FIGURE 1, the actuator assembly includes a cylinder comprising a sleeve 10 having externally threaded portions at both ends which receive a head cap 12 and a tail cap 14. The head and tail caps 12 and 14 are securely assembled with the sleeve 10 by lock nuts 16 and 18, respectively. The head cap 12 has a pair of diametrically opposed trunnions 20 extending therefrom for attaching the actuator cylinder to a fixed support, not shown. In addition, the head cap 12 is formed with an extend port 22 and a stop release cylinder 24, one end of which is closed by a plate 26. A reciprocable piston 28 is disposed within the cylinder 24, the piston 28 being biased to the right by a coil spring 30. The cylinder 24 communicates with a release port 32 formed in the head cap 12 through which fluid under pressure can be supplied to move the piston 28 to the position shown in FIGURE 4.

A reciprocable piston 34 is disposed within the sleeve 10, the piston being attached to a hollow axially extending rod 36 by means of a weld 38. The piston rod 36 extends through a central opening in the tail cap 14, and is slidably supported for movement relative thereto by a bushing 40. The outer end of the piston rod 36 is closed by a plug 42 which is interlocked with the end of the piston rod 36 by interengaging teeth 44 and restrained by a lock nut 46. The plug 42 constitutes an attachment fixture and is formed with an opening 48 for connection to a suitable load device such as the linkage for supporting a wheel of the amphibious vehicle. It is to be understood that both the cylinder and the piston and its associated rod are restrained against rotation by virtue of their connection to a fixed support and the load device, respectively.

A hollow screw shaft 50 is coaxially disposed within the cylinder and extends into the hollow piston rod 36. The screw shaft 50 is journalled in the head cap 12 by a ball bearing assembly 52 including an outer race 54 secured in position by a lock nut 56 and an inner race 58 secured in position by a lock nut 60. The piston 34 has a nut 62 keyed thereto at 64 so as to be restrained against rotation, the nut being connected for movement with the piston 34 by a lock nut 66. The nut threadedly engages the hollow screw shaft 50 such that piston movement is dependent upon and effects rotation of the screw shaft 50.

A torsion bar 68 is coaxially disposed within the hollow screw shaft 50 and has a series of straight spline teeth 70 engaging straight spline teeth 72 on the screw shaft and torsion bar. The straight spline connection between the screw shaft and the torsion bar facilitates axial movement of the torsion bar relative to the screw shaft while constraining the torsion bar for rotation with the screw shaft. In addition, the torsion bar has an axially extending portion 74 connected by a screw 76 to the release piston 28. Accordingly, it will impart reciprocation to the torsion bar 68 relative to the screw shaft 50.

The hollow screw shaft 50 carries a sleeve bearing 78 adjacent its outer end for slidably supporting the torsion bar 68. In addition, the torsion bar 68 has an annulus or stop member 80, straight spline connected at 82 adjacent its outer end and secured against axial movement relative to the torsion bar by a nut 84. The annulus 80 has an arcuate tang 86 defining a pair of circumferentially spaced stop shoulders 87 and 88, as seen in FIGURES 5 and 6.

The piston 34 has an integral arcuate lug 89 disposed radially inward of the piston rod 36 and adjacent the inner end of the piston rod. The piston rod 36 has an arcuate lug 90 attached to a medial portion thereby by a pin 92. The plug 42 is formed with an integral arcuate lug 94 likewise disposed radially inward of the piston rod 36. The lugs 89, 90 and 94 are adapted to coact with the stop annulus 80 attached to the torsion bar 68 under certain conditions as will be pointed out more particularly hereinafter.

The actuator is shown in the fully retracted position in FIGURE 1 whereat the piston 34 is in engagement with the head cap 12, and the lug 94 has face to face engagement with the shoulder 87 on the annulus 80. Engagement between lug 94 and the shoulder 87 precludes rotation of the torsion bar 68, and hence the screw shaft 50 in one direction so as to prevent extension of the actuator piston. Thus, the coacting lug 94 and shoulder 87, in effect, constitute a stop which locks the actuator in the fully retracted position when pressure at port 32 is interrupted. In order to extend the actuator it is necessary to first supply fluid under pressure to the release cylinder 24 so as to move the release piston 28 from the position of FIGURE 1 to the position of FIGURE 4 thereby disengaging the shoulder 87 from the lug 94 by axial movement of the torsion bar 68 to the left, as viewed in FIGURE 1. (Phantom view.)

The piston 34 divides the cylinder into an extend chamber 96 which communicates with the extend port 22 in head cap 12, and the retract chamber 98 which communicates with a retract port 100 formed on the tail cap 14. When the shoulder 87 has been disengaged from the lug 94 by actuation of the release piston 28, as aforedescribed, application of fluid pressure to the extend chamber 96 while the retract chamber 98 is connected to drain, will be effective to move the piston 34 and its rod 36 to the right as viewed in FIGURE 1. As the actuator piston 34 and its rod 36 move to the right, the lug 90 on the piston rod is moved toward the annulus 80 of the torsion bar. If the release cylinder 24 is exhausted after initial movement of the piston 34 to the right, the lug 90 will intercept the shoulder 87 at an intermediate extended position of the actuator piston.

With reference to FIGURE 2, the lug 90 is shown in engagement with shoulder 87 of the annulus 80 at an intermediate extended position of the actuator whereat further extending movement of the actuator is precluded since the torsion bar 68 is again restrained against rotation. In order to move the actuator piston to the fully extended position it is necessary to actuate the release piston 28 hydraulically to disengage the shoulder 87 from the lug 90 so as to permit rotation of the torsion bar 68 and the screw shaft 50. It is pointed out that the axial length of the several lugs 89, 90 and 94 is correlated with the lead of the screw shaft 50 and the extend of the arcuate tang 86 such that there will always be substantially full face to face engagement between the lugs and the stop shoulders at the various stop positions.

When the release piston 28 is actuated so as to move the torsion bar 68 and the annulus 80 to the left, as viewed in FIGURE 2, extending movement of the piston 34 may continue until the actuator is fully extended whereat lug 89 is engageable with the shoulder 87. Thereafter, the torsion bar can be extended again, as indicated by the phantom position of FIGURE 3.

With reference to FIGURES 2 and 3, when the torsion bar 68 is either extended or retracted, the shoulder 87 coacts with the lug 90 on the piston rod 36 to limit extending movement of the piston by face to face engagement between the shoulder 87 and the lug 90 as seen in FIGURE 5. When the shoulder 87 engages the lug 90 further extending movement of the piston 36 is prevented, since the torsion bar 68 and the screw shaft 50 cannot rotate in the counterclockwise direction as viewed in FIGURE 5. The restraining force results in twisting of the torsion bar 68 and thus effectively resiliently stops further movement of the actuator piston in the extending direction.

With the torsion bar 68 and the annulus 80 extended, piston movement is now limited between the fully extended and partially extended position since the lug 89 will engage the shoulder 87 when the piston is moved to the fully extended position and the lug 90 will engage the shoulder 88 in the partially extended position. Between the fully and partially extended position of the piston rod, the actuator may be operated as a hydraulic spring accumulator between the retract and extend ports of the actuator cylinder. The lugs 84 and 90 coact with the angularly spaced stop shoulders 87 and 88, respectively, on the stop annulus member 80 which constitute torsionally resilient stop means limiting actuator movement under these conditions.

When it is desired to fully retract the actuator, the release cylinder 24 is pressurized to retract the torsion bar 68 and thus allow the lug 90 to pass by the arcuate lug 87 on the stop annulus member 80. When the actuator piston is fully retracted the release cylinder is again exhausted to engage shoulder 87 with the lug 94 to lock the actuator in the fully retracted position.

While the embodiment of the invention as herein disclosed constitues a preferred form, it is to be understood that other forms might be adopted.

What is claimed is as follows:

1. An actuator assembly including, a cylinder, a reciprocable piston disposed in said cylinder, a rotatable member journalled in said cylinder and operatively connected to said piston such that piston movement is dependent upon rotation of said member, a torsion bar connected to rotate with said member, and coacting stop means on said piston and said torsion bar for precluding rotation of said torsion bar, and hence said member, in one direction so as to arrest movement of said piston at a plurality of predetermined positions.

2. An actuator assembly including, a cylinder, a reciprocable piston disposed in said cylinder, a rotatable member journalled in said cylinder and operatively connected with said piston such that piston movement is dependent upon rotation of said member, a torsion bar connected to rotate with said member but capable of axial movement relative thereto, coacting stop means on said piston and said torsion bar for precluding rotation of said torsion bar, and hence said member, in one direction so as to arrest movement of said piston at a plurality of predetermined positions, and means operable to effect axial movement of said torsion bar to disengage said coacting stop means to permit further movement of said piston.

3. An actuator assembly including, a cylinder, a reciprocable piston disposed in said cylinder, a screw shaft having operative threaded engagement with said piston such that piston movement is dependent upon rotation of said screw shaft, a torsion bar connected to rotate with said screw shaft, and coacting arcuate stop lugs on said piston and spaced stop shoulders on said torsion bar for precluding rotation of said torsion bar, and hence said screw shaft, in one direction so as to arrest movement of said piston at a plurality of predetermined positions.

4. An actuator assembly including, a cylinder, a reciprocable piston disposed in said cylinder, a screw shaft journalled in said cylinder having operative threaded engagement with said piston such that piston movement is dependent upon rotation of said screw shaft, a torsion bar coaxially disposed within said screw shaft and drivingly connected to rotate therewith but capable of axial movement relative thereto, coacting arcuate stop lugs on said piston and spaced stop shoulders on said torsion bar for precluding rotation of said torsion bar, and hence said screw shaft, in one direction so as to arrest movement of said piston at a plurality of predetermined positions, and means operable to effect axial movement of said torsion bar to disengage said coacting stop lugs and permit further movement of said piston.

5. An actuator assembly including, a cylinder, a reciprocable piston disposed in said cylinder having a hollow rod extending outside of said cylinder, a nut rigidly attached to said piston, a hollow screw shaft journalled in said cylinder and coaxially arranged within said hollow piston rod, said nut having threaded engagement with said screw shaft such that piston movement is dependent upon and effects rotation of said screw shaft, a torsion bar drivingly connected with said screw shaft so as to rotate therewith, and internal arcuate stop lug attached to said piston rod between its ends, and circumferentially spaced coacting stop shoulders attached to said torsion bar and engageable with said piston rod carried stop lug at a predetermined position of said piston within said cylinder for precluding rotation of said torsion bar, and hence said screw shaft, in one direction so as to arrest movement of said piston at said predetermined position.

6. The actuator assembly set forth in claim 5 wherein the driving connection between said screw shaft and said torsion bar comprises interengaging straight splines on said screw shaft and said torsion bar such that said torsion bar is capable of axial movement relative to said screw shaft.

7. The actuator assembly set forth in claim 6 including means operable to effect axial movement of said torsion bar relative to said screw shaft to disengage said coacting stop lug and stop shoulders to permit further movement of said piston.

8. The combination set forth in claim 5 wherein said piston rod has arcuate lugs adjacent its inner and outer ends engageable with the stop shoulders on said torsion bar and constituting stroke end limit stops determining the fully extended and fully retracted positions of said actuator piston.

9. A fluid pressure operated actuator including, a cylinder having a reciprocable piston therein capable of fluid pressure differential actuation in opposite directions, a rotatable member journalled in said piston and operatively connected to said piston such that piston movement is dependent upon and effects rotation of said member, a torsion bar connected to rotate with said member but capable of axial movement relative thereto, coacting stop means on said piston and said torsion bar for precluding rotation of said torsion bar, and hence said member, in one direction so as to arrest movement of said piston at a plurality of predetermined positions, and fluid pressure operated means for effecting axial movement of said torsion bar to disengage said coacting stop means and permit further movement of said piston.

10. A fluid pressure operated actuator including, a cylinder, a rotatable piston disposed in said cylinder and dividing said cylinder into opposed chambers which can be subjected to differential pressures to effect movement of said piston in opposite directions, a rotatable member journalled in said cylinder and operatively connected with said piston such that piston movement is dependent upon and effects rotation of said member, a torsion bar connected to rotate with said member but capable of axial movement relative thereto, coacting stop means on said piston and said torsion bar for precluding rotation of said torsion bar, and hence said member, in one direction so as to arrest movement of said piston at a plurality of predetermined positions, and a fluid pressure operated release piston connected to said torsion bar for effecting axial movement thereof to disengage said coacting stop lugs and permit further movement of said piston.

References Cited in the file of this patent

UNITED STATES PATENTS

| | | |
|---|---|---|
| 2,970,573 | Geyer | Feb. 7, 1961 |
| 2,988,059 | Wysong | June 13, 1961 |
| 3,022,772 | Zeigler et al. | Feb. 27, 1962 |